(12) United States Patent
Dai et al.

(10) Patent No.: US 8,351,676 B2
(45) Date of Patent: Jan. 8, 2013

(54) DIGITAL IMAGE ANALYSIS USING MULTI-STEP ANALYSIS

(75) Inventors: Shengyang Dai, San Jose, CA (US); Su Wang, San Jose, CA (US); Akira Nakamura, San Jose, CA (US); Takeshi Ohashi, Kanagawa (JP); Jun Yokono, Tokyo (JP)

(73) Assignee: Sony Corporation, Tokyo (JP)

(*) Notice: Subject to any disclaimer, the term of this patent is extended or adjusted under 35 U.S.C. 154(b) by 347 days.

(21) Appl. No.: 12/902,321

(22) Filed: Oct. 12, 2010

(65) Prior Publication Data

US 2012/0087556 A1  Apr. 12, 2012

(51) Int. Cl.
G06K 9/00 (2006.01)
G06K 9/34 (2006.01)

(52) U.S. Cl. ......... 382/133; 382/128; 382/134; 382/173

(58) Field of Classification Search .............. 382/128, 382/133, 134
See application file for complete search history.

(56) References Cited

U.S. PATENT DOCUMENTS

| | | | |
|---|---|---|---|
| 7,577,280 B2* | 8/2009 | Guittet et al. ............... | 382/128 |
| 7,693,334 B2* | 4/2010 | Ogura et al. ................ | 382/190 |
| 7,949,181 B2* | 5/2011 | Padfield et al. ............. | 382/164 |
| 8,280,132 B2* | 10/2012 | Madabhushi et al. ....... | 382/128 |
| 2010/0014756 A1* | 1/2010 | Kato et al. .................. | 382/173 |
| 2010/0111396 A1* | 5/2010 | Boucheron .................. | 382/133 |
| 2010/0177950 A1* | 7/2010 | Donovan et al. ............ | 382/133 |
| 2010/0322489 A1* | 12/2010 | Tizhoosh et al. ........... | 382/128 |

OTHER PUBLICATIONS

Gurcan, M.N.; Boucheron, L.E.; Can, A.; Madabhushi, A.; Rajpoot, N. M.; Yener, B.; , "Histopathological Image Analysis: A Review," Biomedical Engineering, IEEE Reviews in , vol. 2, No., pp. 147-171, 2009.*

* cited by examiner

*Primary Examiner* — Bhavesh Mehta
*Assistant Examiner* — Utpal Shah
(74) *Attorney, Agent, or Firm* — Haverstock & Owens LLP

(57) ABSTRACT

Systems and methods for implementing a multi-step image recognition framework for classifying digital images are provided. The provided multi-step image recognition framework utilizes a gradual approach to model training and image classification tasks requiring multi-dimensional ground truths. A first step of the multi-step image recognition framework differentiates a first image region from a remainder image region. Each subsequent step operates on a remainder image region from the previous step. The provided multi-step image recognition framework permits model training and image classification tasks to be performed more accurately and in a less resource intensive fashion than conventional single-step image recognition frameworks.

18 Claims, 13 Drawing Sheets

DIGITAL IMAGE ANALYSIS USING MULTI-STEP ANALYSIS

TECHNICAL FIELD

The present disclosure relates to systems and methods for classifying digital image data and, more particularly, for classifying digital pathology image data.

BACKGROUND

Pathology imaging is one of the last fields in medical imaging yet to be digitized. Compared to other well-developed medical imaging modalities, such as Computed Tomography (CT) and Magnetic Resonance Imaging (MRI), digitized pathology images are characterized by super-high image resolution, non-uniform texture patterns, and densely-structured segments. In addition, the diversity of cancer types leads to constantly changing image patterns, which makes it even more challenging to develop fully-automatic image classification algorithms.

Digitized pathology images are created from tissue samples stained with different methods for different diagnosing purposes, such as H&E (hematoxylin and eosin) and IHC (immunohistochemical) staining. Both of these staining methods are widely used in pathology, and H&E staining is particularly common for use in biopsy of suspected cancerous tissue.

Conventional pathology image analysis methods utilize human labor to individually examine and label the stained pathology images. This practice requires a great deal of human labor, is time consuming, and is subject to the subjectivity of the pathologist.

To date, digitalization of pathology image analysis has seen only small amounts of development. Some conventional image recognition frameworks rely on single-step methods for model training and image classification. A model building phase of a conventional technique may involve building models based on training data sets that have been labeled with ground truth labels by a human analyst. In such conventional techniques, the pixels of a training data set may be labeled according to a ground truth having multiple dimensions. For instance, each pixel of a digitized pathology image may be labeled by tissue type, where there are multiple tissue types from which to select. The pixels of a digital training data set may also be characterized according to multiple features. Each of these multiple features may have multiple dimensions. These multiple features may then be concatenated to yield a high-dimensional data set that describes each pixel. An image recognition model is then generated with machine learning techniques using the high-dimensional data set and the multi-dimensional ground truth. Because each pixel may be described by hundreds of feature dimensions as well as multiple ground truth dimensions, in an image containing millions of pixels, the quantity of data rapidly becomes difficult to process. The requirement of a computer to keep all of the features and ground truth dimensions in memory at once leads to delays in processing and high memory requirements. Conventional training techniques may take a long time and, because of processor requirements, may use only small subsets of training data to train the models. Classification phases of conventional single-step image recognition frameworks suffer from similar problems.

It is therefore desirable to provide a faster and more efficient multi-step image recognition framework. Such a multi-step image recognition framework may gradually build models by working with a limited number of ground truth dimensions and a elected group of features in each step. Multi-step image recognition frameworks may also utilize a multi-layer feature extraction method in order to reduce the pixel feature dimension. By reducing computing power and memory requirements, larger portions of training data may be used to train the multi-step image recognition models proposed herein.

SUMMARY

Methods and systems are disclosed herein for processing digital pathology images. One embodiment consistent with the disclosure allows a multi-step image recognition framework to gradually classify multiple regions of a digitized pathology image. A computer-implemented feature extraction method for classifying pixels of a digitized pathology image is performed by a system comprising at least one processor and at least one memory and comprises the steps of generating a plurality of characterized pixels from a digitized pathology image; determining by the system in a first step feature analysis a first region and a first remainder region of the digitized pathology image based on the plurality of characterized pixels; determining by the system in a plurality of subsequent feature analysis steps subsequent regions and subsequent remainder regions, wherein each feature analysis step determines a corresponding image region and a corresponding remainder region based on a remainder region determined by an earlier feature analysis step; and classifying by the system part or all of the digitized pathology image based on the determined first region, and the determined subsequent regions.

BRIEF DESCRIPTION OF DRAWINGS

The accompanying drawings, which are incorporated in and constitute a part of this specification, illustrate the invention and, together with the description, serve to explain the principles of the invention.

DETAILED DESCRIPTION

Reference will now be made in detail to exemplary embodiments as illustrated in the accompanying drawings. Wherever possible, the same reference numbers will be used throughout the drawings and the following description to refer to the same or like parts. These embodiments are described in sufficient detail to enable those skilled in the art to practice the inventions and it is to be understood that other embodiments may be utilized and that changes may be made without departing from the scope of the present invention. The following detailed description, therefore, is not to be taken in a limited sense. The exemplary multi-step, multi-layer image recognition techniques are presented here as applied to digital pathology images of healthy and cancerous colon organ tissue. It is understood that these image recognition techniques are not limited to use with colon organ images.

Exemplary systems and methods disclosed herein use a multi-step, multi-layer image recognition framework to improve performance of an automated or semi-automated feature extraction technique over that of a single-step image recognition framework. A digital pathology image may be classified according to a multi-dimensional ground truth. A multi-dimensional ground truth comprises multiple labels, such as image background, stroma tissue, malignant gland tissue, benign gland tissue, and healthy gland tissue. A multi-step image recognition framework may gradually classify an image, differentiating one region of the image, corresponding to one ground truth label, per step. For instance, a first step may differentiate image background from a tissue region. A second step may differentiate the tissue region into a stroma region and a gland region. A third step may differentiate the gland region into a malignant cancerous gland region and a not-malignantly-cancerous gland region. A fourth step may differentiate the not-malignantly-cancerous gland region into a benign cancerous gland region and a healthy gland region.

Figure 1:
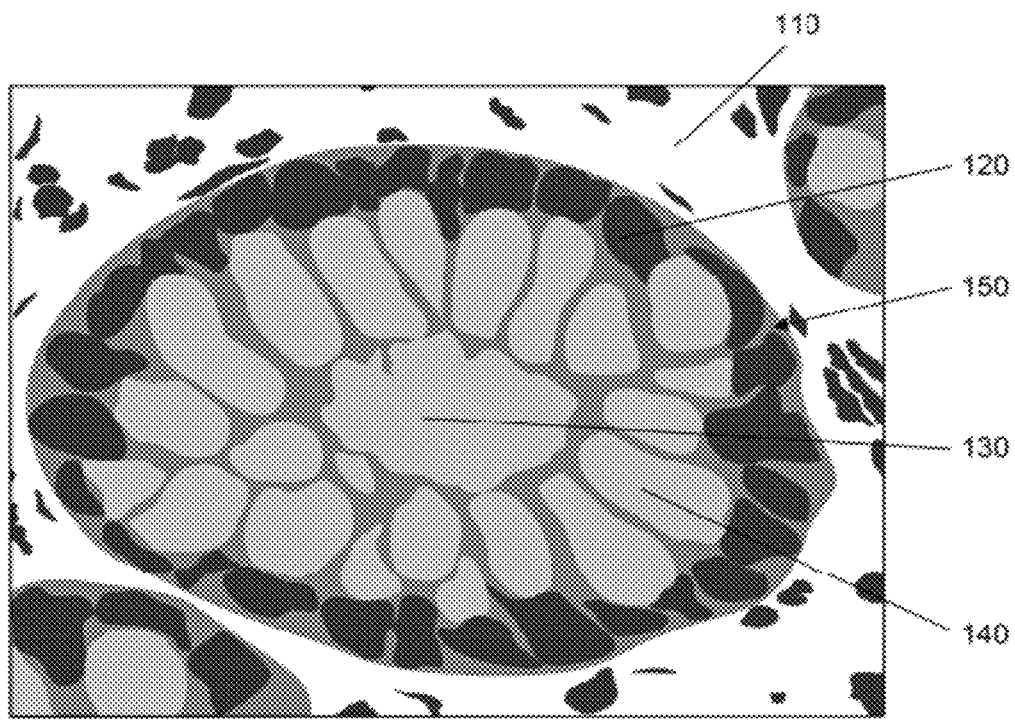
FIG. 1 shows a typical pathology image depicting hematoxylin and eosin staining of a local region of normal colon organ tissue.

FIG. 1 shows a typical pathology image 100 showing hematoxylin and eosin staining of a local region of normal colon organ tissue. Further illustrated are four different tissue types, the stroma 110, nucleus 120, lumen 130, and goblet 140. Collectively, the nucleus 120, lumen 130, and goblet 140 comprise the gland 150.

In exemplary embodiments described herein, a cancer grading task may be performed. Cancer grading analysis seeks to automatically classify the various tissue and cancer types of a digitally-stored pathology image. For example, in a multi-step cancer grading analysis task consistent with the present disclosure, analysis techniques may be used to classify a particular pixel or group of pixels from a digitally-stored pathology image as either image background or tissue, the stroma region 110 or the gland region 150, malignant gland tissue or non-malignant cancerous gland tissue, and benign gland tissue or healthy gland tissue.

Figure 2:
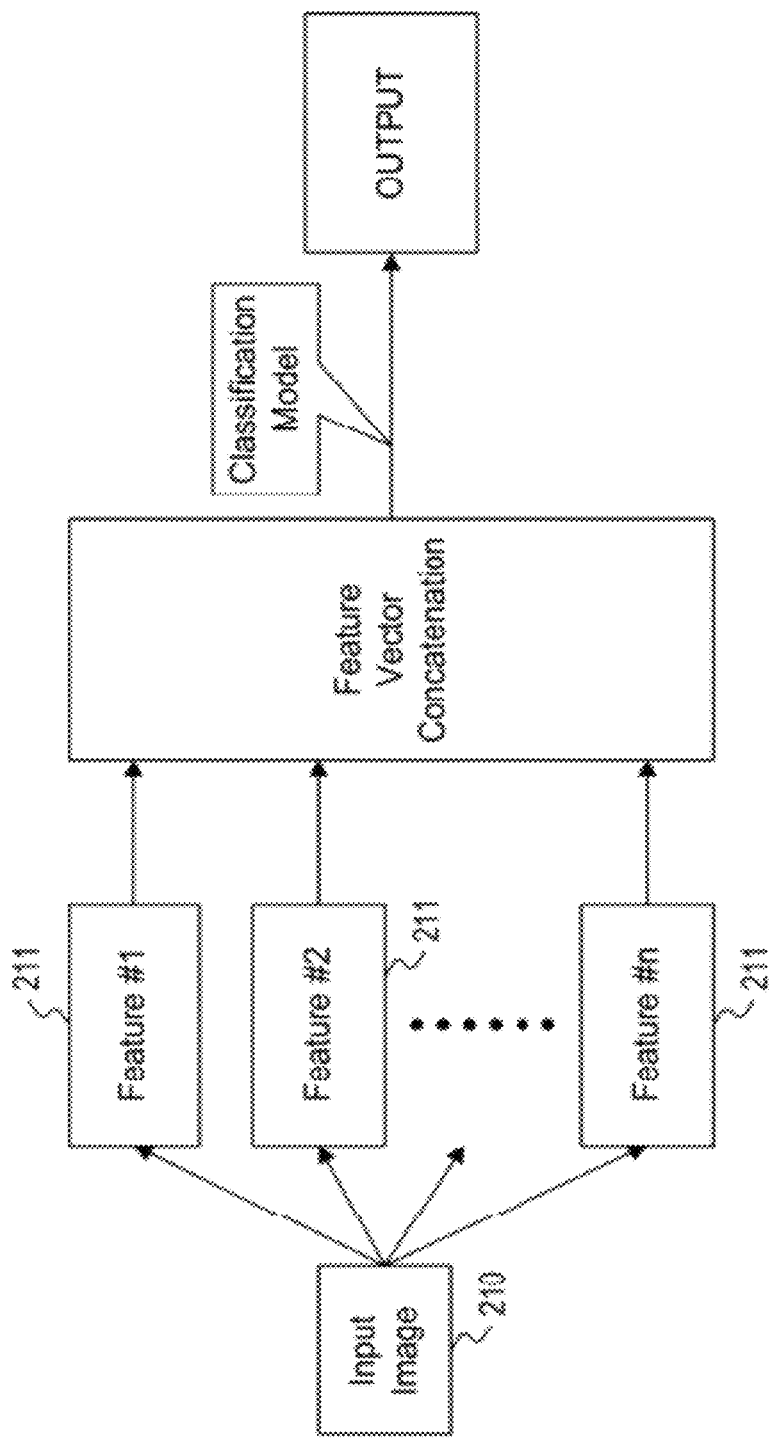
FIG. 2 illustrates a conventional single layer, single-step classification framework.

FIG. 2 illustrates a conventional single layer, single-step image classification framework. As previously described, a conventional image classification framework concatenates all of the single layer features 211 of an input image 210 in a single-step.

Exemplary methods and systems disclosed herein may be implemented in two distinct phases: a model training phase and a classification phase. A model training phase may utilize training data and machine-learning techniques to build an image classification model. Training data may comprise digital pathology images that have been labeled by a pathologist according to a multi-dimensional ground truth. A classification phase applies the image classification model to new digital pathology images in order to classify each pixel according to the multiple labels of a ground truth. An image classification model consistent with this disclosure may comprise multiple sub-layer models and multiple sub-step models. A multi-step, multi-layer image classification model consistent with this disclosure operates to classify all or some of the pixels of the digitally-stored pathology image as belonging to each of the multiple classifications represented by the multiple labels of a ground truth.

Figure 3:
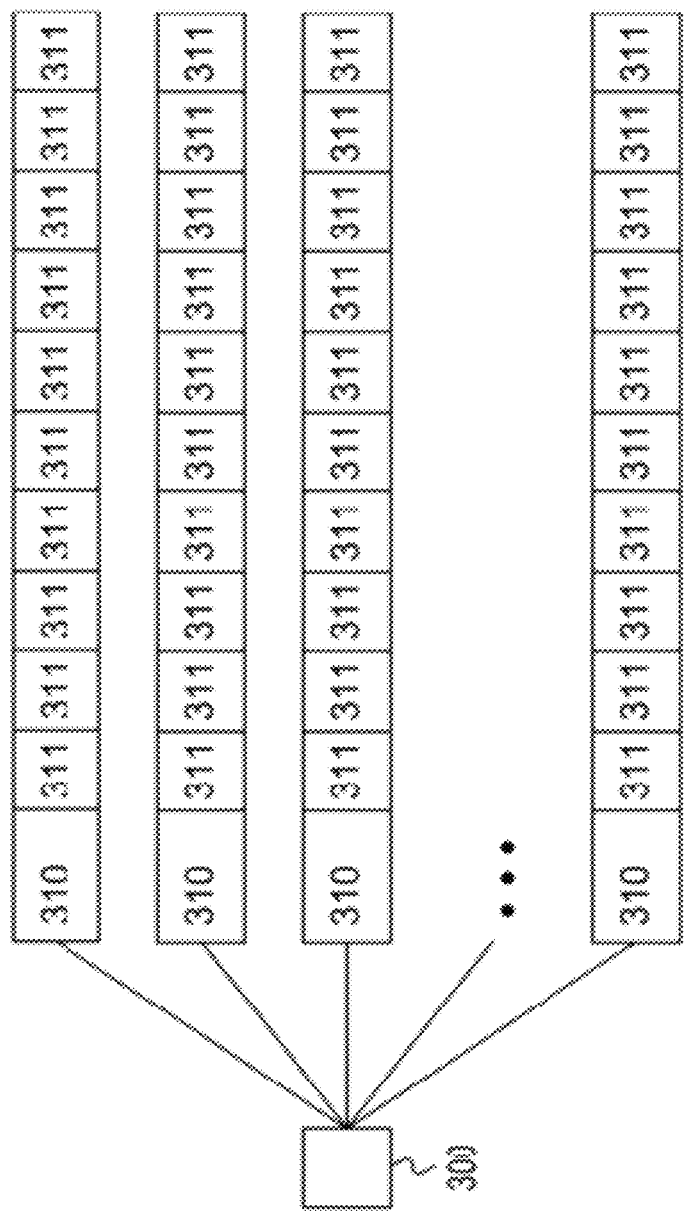
FIG. 3 is an image depicting exemplary pixel features and feature descriptor structure of a characterized pixel.

FIG. 3 is an image depicting exemplary pixel features and a feature descriptor structure of a characterized pixel. An image recognition framework consistent with the present disclosure may utilize characterized pixels 300 of a digital pathology image. The pixels 300 may be automatically characterized by computer-implemented methods. Pixels may be characterized, for instance, by a multiple scale intensity histogram, histogram of the gradient, or scale-invariant feature transform. A person of skill in the art will recognize various methods and techniques with which to characterize each pixel.

As shown in FIG. 3, a characterized pixel 300 may be characterized by multiple pixel features 310, each of a different feature type, such as color or texture feature types. Each pixel feature 310 may be characterized by multiple feature descriptors 311. Each pixel feature 310 may be of a feature type selected from amongst multiple possible feature types. The number of feature descriptors 311 characterizing each pixel feature 310 is the dimension of the pixel feature 310. The features 310 and feature descriptors 311 characterizing each pixel may contain data related to the pixel itself or may contain data related to the local and global neighboring pixels.

For instance, a designated pixel may be characterized by a color pixel feature 310, of a color feature type, that may comprise multiple color pixel feature descriptors 311. Each color pixel feature descriptor 311 may contain information pertaining to the color of the designated pixel or to the color of the pixels surrounding the designated pixel, either locally or globally.

Each pixel of a digital image may be characterized by any number of pixel features 310, each of which in turn may be characterized by any number of feature descriptors 311. Thus, each pixel of a digital image may easily be associated with thousands of feature descriptors 311 in total.

Figure 4A:
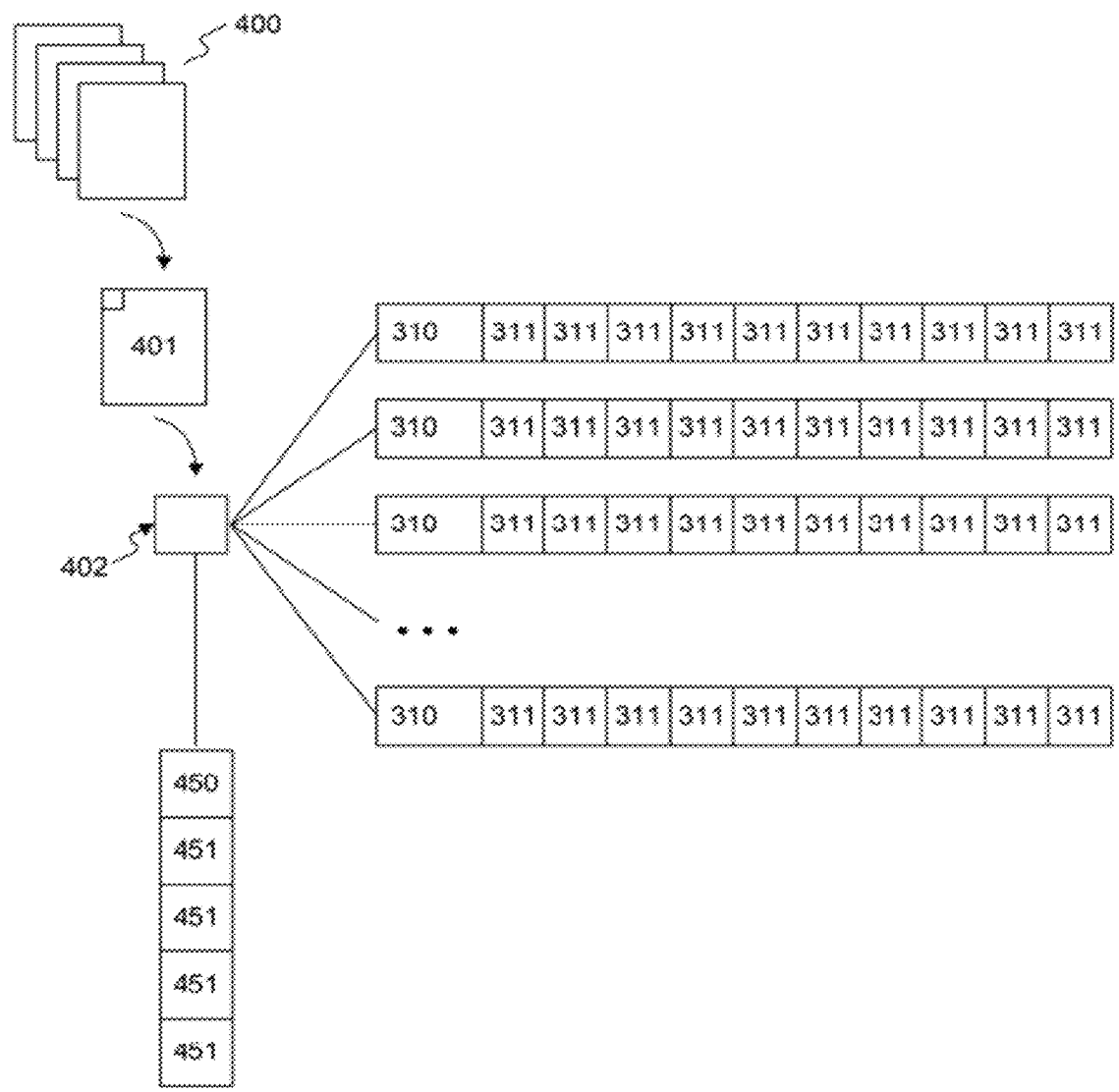
FIGS. 4a-4b are images depicting exemplary pixel, image region, and ground truth structure of a characterized and labeled digital pathology training set.

FIG. 4a illustrates an exemplary structure of an image training data set 400. An image training data set 400 may comprise multiple digital training images 401 that have been labeled by an operator with ground truths 450. Each ground truth 450 may comprise multiple ground truth labels 451. Individual pixels or image regions comprising multiple pixels of a training image 401 may be examined by a trained operator, such as a pathologist, and assigned a ground truth label 450 based on characteristics of the individual pixels or region. The ground truth label 450 applied to a pixel or region, may indicate, for instance, that the pixel or region so labeled represents stroma 110 tissue. All or some of pixels 402 of a digital training image 401 may be labeled by an operator with multiple ground truth labels 450, each comprising multiple labels 451.

All or some of the characterized training pixels 402 of a digital training image 401 may be characterized by multiple pixel features 310. Each pixel feature 310 may be characterized by multiple feature descriptors 311, which may be used to produce a characterized training data set 400. Each characterized training pixel 402 of the characterized digital training image 401 may be characterized by all or some of the pixel features 410 to be utilized by the image recognition framework. It is not required that each pixel 402 of a characterized digital training image 401 be characterized, or that each characterized training pixel 402 be characterized by all of the pixel features 310 utilized by the image classification model. Thus, each characterized pixel 402 may be characterized by multiple features 310 and multiple ground truths 450, each comprising multiple labels 451.

Figure 4B:
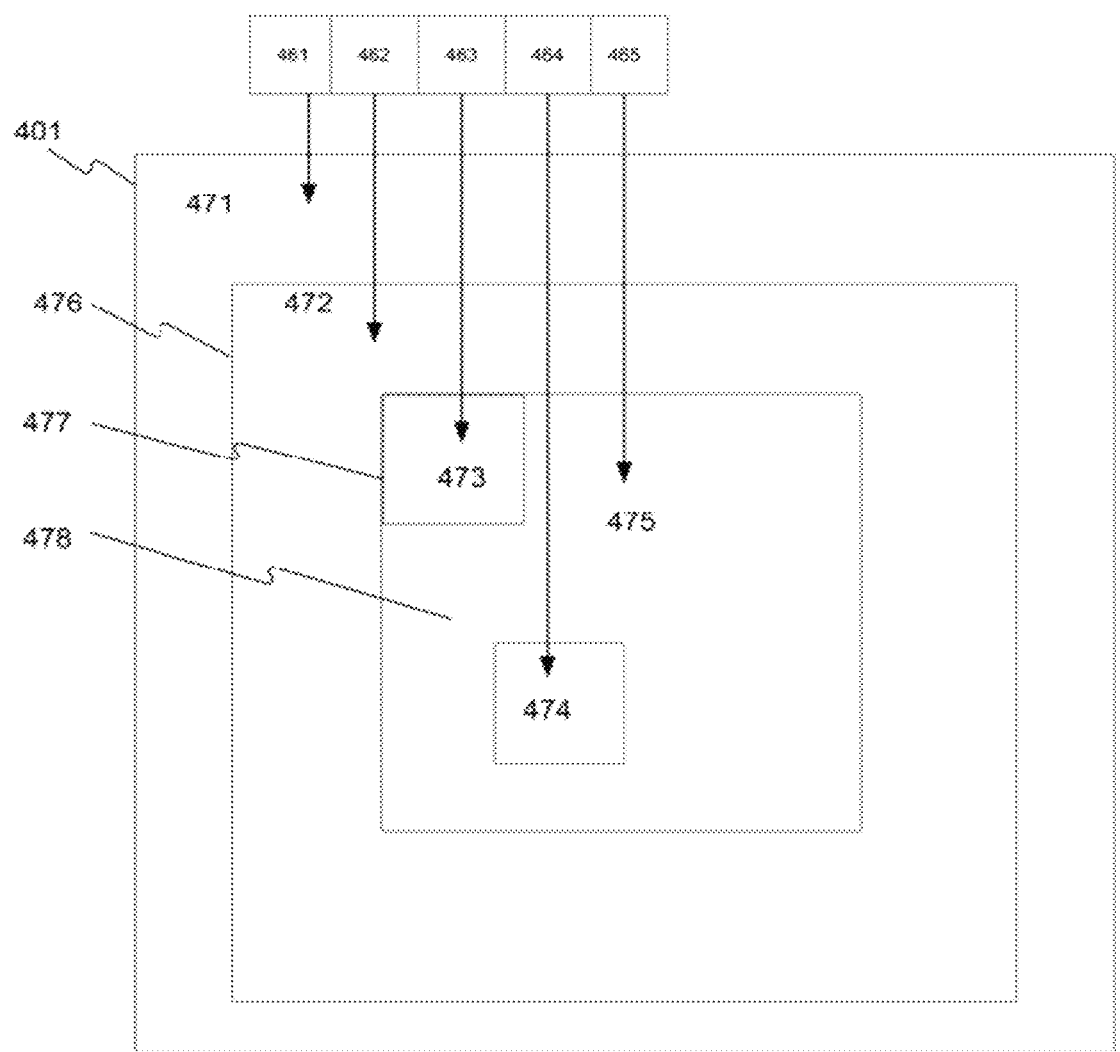

FIG. 4b illustrates the structure of regions and ground truth labels of an exemplary digital pathology training image 401. In an exemplary multi-step image recognition framework, a set of multiple ground truth labels 451 may comprise an image background ground truth label 461, a stroma tissue ground truth label 462, a malignantly cancerous gland ground truth label 463, a benignly cancerous gland ground truth label 464, and a healthy gland ground truth label 465. A digital pathology image 401 may comprise five disjoint regions, an image background region 471, a stroma region 472, a malignantly cancerous gland region 473, a benignly cancerous gland region 474, and a healthy gland region 475. As illustrated in FIG. 4b, these regions may respectively be labeled with an image background ground truth label 461, a stroma tissue ground truth label 462, a malignantly cancerous gland region ground truth label 463, a benignly cancerous gland region ground truth label 464, and a healthy gland region ground truth label 465.

Additionally, as illustrated in FIG. 4b, combinations of these five disjoint image regions may make up additional image regions. A tissue region 476 may consist of a stroma region 472, a malignantly cancerous gland region 473, a benignly cancerous gland region 474, and a healthy gland region 475. A gland region 477 may consist of a malignantly cancerous gland region 473, a benignly cancerous gland region 474, and a healthy gland region 475. A not-malignantly-cancerous gland region 478 may consist of a benignly cancerous gland region 474, and a healthy gland region 475. These additional regions do not require separate ground truth labels 451 because they may be represented by a combination of the previously described ground truth labels. For instance, because the tissue region 476 consists of every region except for the image background region 471, it may be represented by any of the ground truth labels 451 that are not the image background ground truth label 461. A person of skill in the art will recognize that a similar successive labeling framework could be applied using different sets of ground truth labels 451. It is also recognized that the various regions described above are not required to be contiguous. Thus, for instance, a digital image may have multiple separate areas that represent malignantly cancerous gland tissue. Those areas together are herein referred to as a malignantly cancerous gland region 473.

Figure 5:
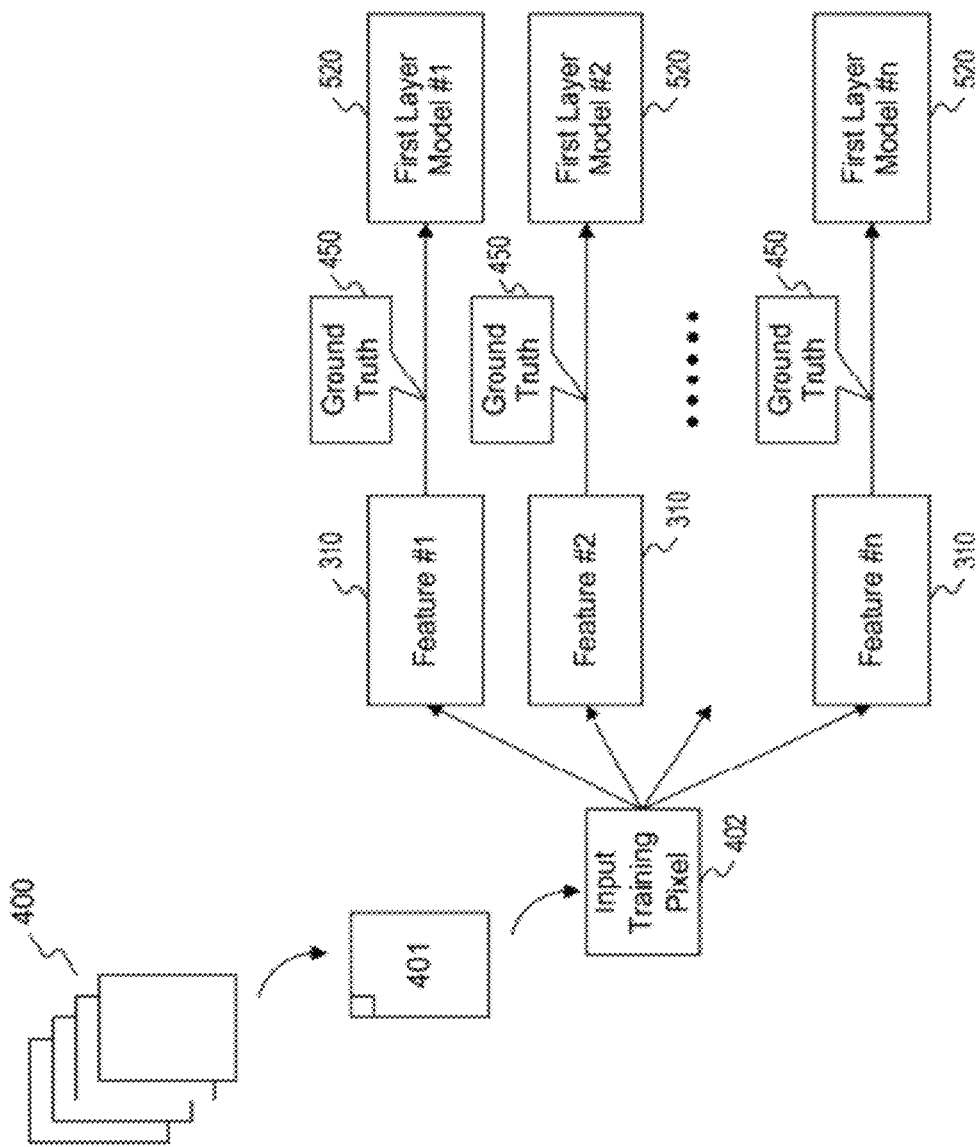
FIG. 5 illustrates an exemplary first layer feature extraction framework training phase.

FIG. 5 is a diagram illustrating an exemplary first layer feature extraction framework training phase. During a first layer feature extraction model training phase, multiple sub-layer models are built using machine learning techniques. As shown in FIG. 5, the model training phase may utilize an image training data set 400. The image training data set 400 may comprise multiple training images 401. Each training image 401 may be characterized by multiple pixel features 310 and pixel feature descriptors 311, as shown in FIG. 3.

Machine learning algorithms are utilized to build multiple first layer models 520 from the characterized training pixels 402 and ground truth labels 450 of the characterized training data set 400. A first layer model 520 may be built by associating some or all of the feature descriptors 311 of the pixel features 310 of a specific feature type belonging to the characterized training pixels 402 of the characterized digital training images 401 with one or more of the ground truth labels 451 previously assigned to each characterized training pixel 402 being used. It is not required that all of the digital training images 401 or all of the characterized training pixels 402 be utilized in building each first layer model 520. Thus, each individual first layer model 520 may be built to associate some or all of the feature descriptors 311 of a specific type of pixel feature 310 with one or more ground truth label 451. In this way, for instance, a first layer model 520 for an individual feature 310 may be built to distinguish image background from tissue, by associating combinations of values of the various pixel feature descriptors 311 of a pixel feature 310 with one or more ground truth label 451 of a multi-dimensional ground truth 450, representing image background, of the characterized training pixels 402 to which the various pixel feature descriptors 311 belong.

Figure 6:
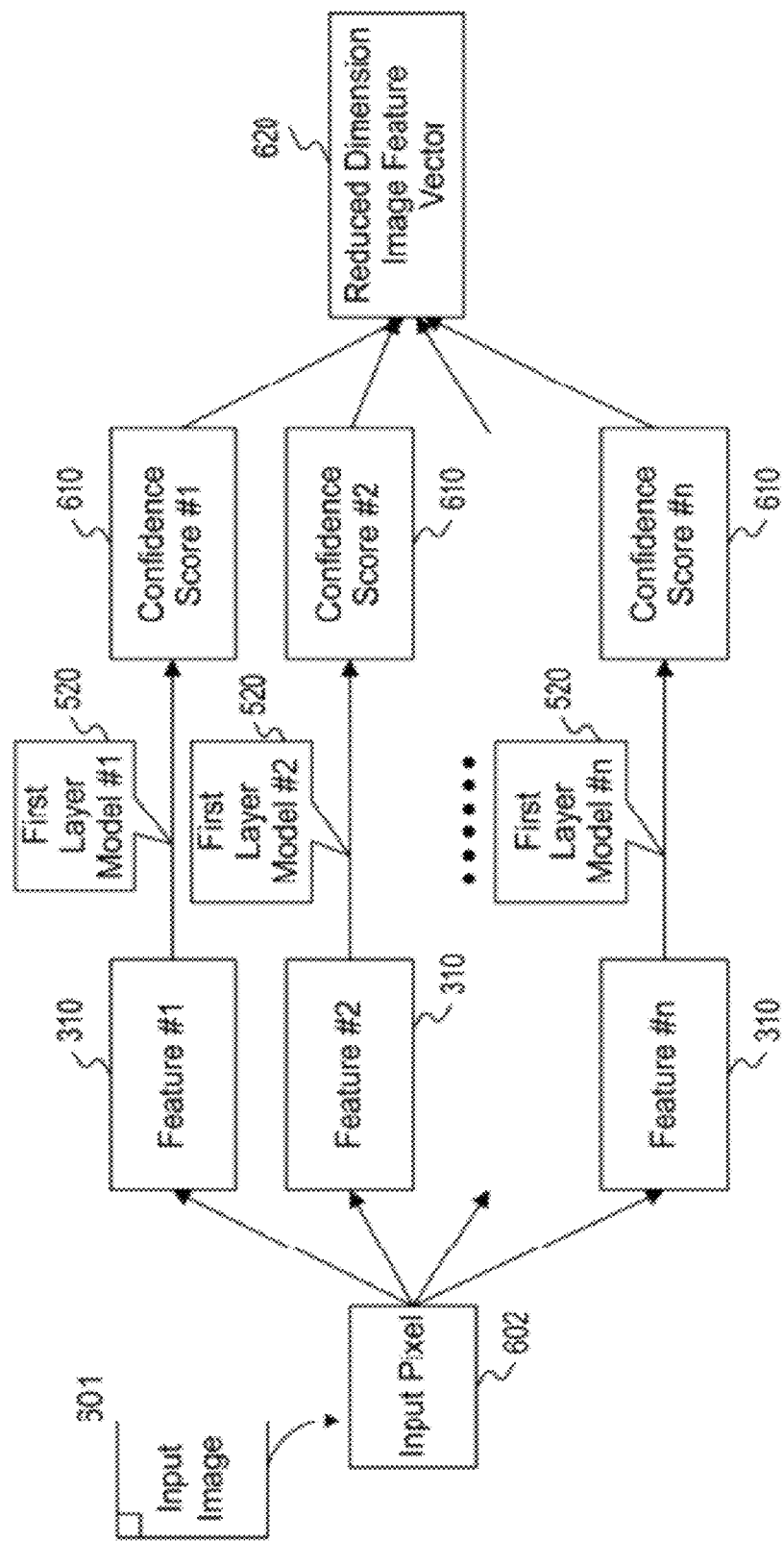
FIG. 6 illustrates an exemplary first layer feature extraction framework classification phase.

FIG. 6 illustrates an exemplary first layer feature extraction framework classification phase. A first layer feature extraction framework operates to generate a reduced dimension image feature vector 620 for the characterized pixels 602 of an input image 601. During a first layer feature extraction framework classification phase, a confidence score 610 for all or some of pixel features 310 of all or some of the characterized pixels 602 is generated. Thus, each characterized pixel 602 may be associated with multiple first layer confidence scores 610. A first layer confidence score 610 of a characterized pixel 602 is generated by applying a first layer model 520 to the feature descriptors 311 of the pixel feature 310 associated with each first layer model 520. A first layer confidence score 610 represents the likelihood that each characterized pixel 602 should be labeled with a specific ground truth label 451 based on the feature 310 associated with the model 520 that generated the confidence score 610. For example, a confidence score 610 may be generated to represent the likelihood that a pixel 402 should be classified as belonging to an image background region 471 based on an intensity pixel feature 310.

The multiple first layer confidence scores 610 associated with a specific ground truth label 450 of a characterized training pixel 402 may then be concatenated into a single reduced dimension image feature vector 620. A reduced dimension image feature vector 620 is similar to a feature 310, but comprises first layer confidence scores 610, each one representing a likelihood that the pixel 402 should be labeled with the specific ground truth label 451 associated with the reduced dimension image feature vector 620, rather than feature descriptors 311. Each characterized pixel 402 may thus be associated with a single reduced dimension image feature vector 620 for each specific ground truth label 451 For example, a reduced dimension image feature vector 620 may be generated to represent all of the calculated likelihoods that a pixel 402 should be labeled as belonging to an image background region 471, wherein each likelihood is calculated from a different image feature 310. The reduced dimension image feature vectors 620 may then be used in further processing to produce a confidence map of the digital image 401, wherein each pixel of the confidence map is chosen to represent a likelihood that a corresponding pixel of the digital image 401 belongs to a region associated with a specific ground truth label 451.

FIGS. 7a-d are flowcharts, each illustrating one step of an exemplary multi-step image recognition framework model training task. During a multi-step image recognition framework model training phase, multiple sub-step models are generated to complete sub-steps of an image recognition task. As shown in FIGS. 7a-d, each sub-step may generate a model using the ground truth label 451 associated with a different region of the operator labeled image. The sub-steps may be completed serially or in parallel. The previously-labeled digital training image 401 may be used as the input to the first step. Digital training image 401 may be differentiated, through the use of the ground truth labels 451, into a tissue region 476, a gland region 477, and a not-malignantly-cancerous gland region 478 in order to use these sub-regions as inputs to the second, third, and fourth steps of the training phase. A multi-step image recognition framework model training phase may proceed as follows.

Figure 7A:
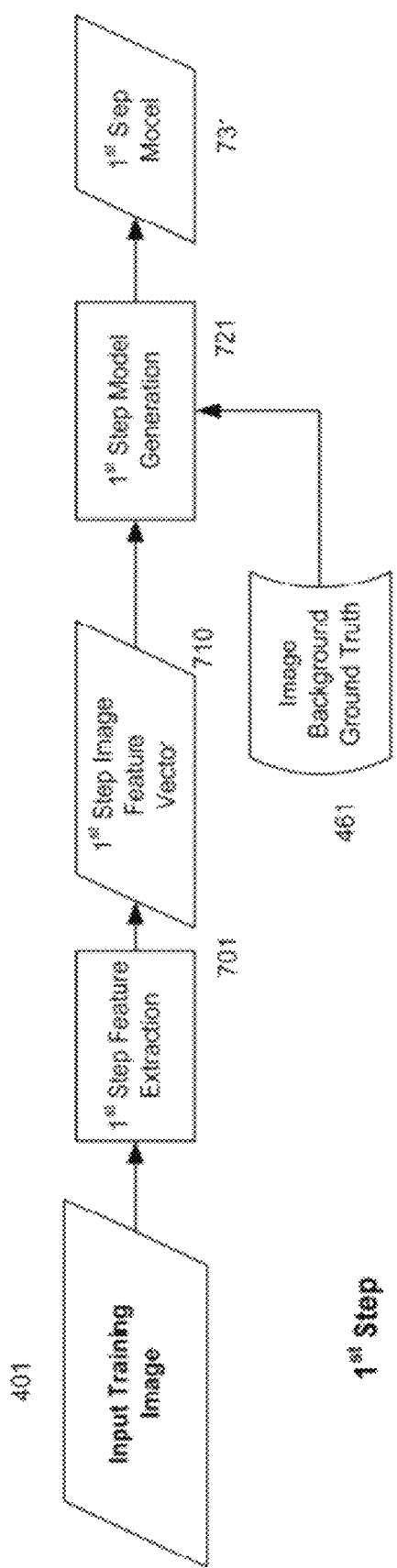
FIGS. 7a-7d are flowcharts illustrating the steps of an exemplary multi-step image recognition framework model training task

As illustrated in FIG. 7a, a first step of a multi-step image recognition framework model training phase builds a first step model 731 to differentiate a first region of the digital image from a remainder of the digital image. An input digital training image 401, previously labeled with a multi-dimensional ground truth 450, may be characterized in a first step feature extraction step 701. A training phase may generate models based on a single input digital training image 401 or from a digital image set 400 comprising multiple training images 402.

A first step feature extraction step 701 may utilize any suitable feature extraction techniques, including conventional feature extraction techniques as described with reference to FIG. 2 or first layer feature extraction techniques as described with reference to FIG. 5 and FIG. 6. The features 310 and feature descriptors 311 used to produce a first step image feature vector 710 by which the image 401 is characterized in step 701 may be specifically chosen for suitability in building a first step model 731. All or some of the pixels 402 may be characterized by the first step feature extraction step 701. Such suitability may be determined, for example, through automatic means or through trial and error.

A first step model 731 is then generated using machine learning techniques in a first step model generation step 721 by associating the feature descriptors of the first step image feature vector 710 with one ground truth label 451 of the multi-dimensional ground truth 450. In the first-step model building phase of an exemplary multi-step image recognition framework for performing a multi-step cancer grading task, a first-step model 731 may be built using an image background ground truth label 461. Thus, an exemplary first-step model may be used during a classification phase to differentiate a digital pathology image 401 into an image background region 471 and the remainder, a tissue image region 476.

Figure 7B:
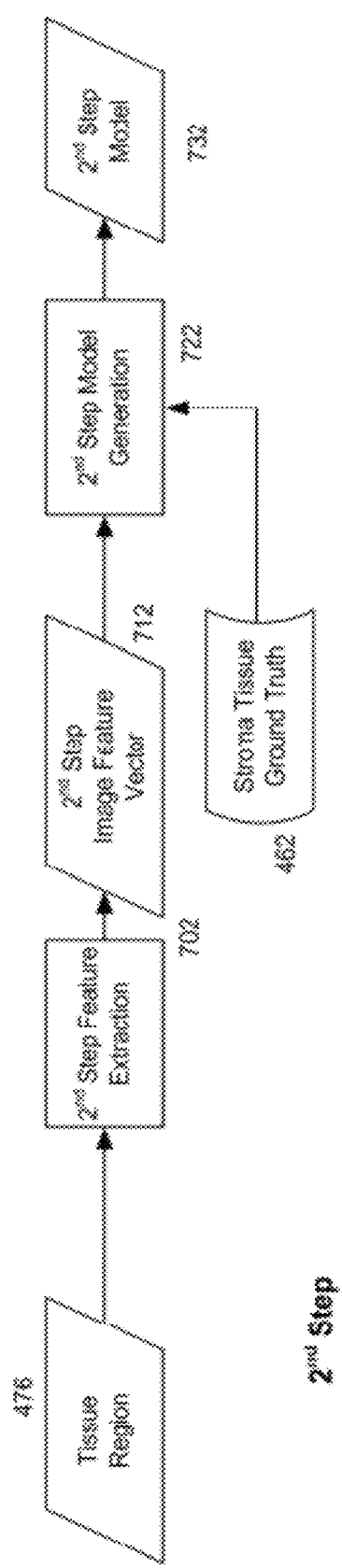

As illustrated in FIG. 7b, a second step of a multi-step image recognition framework model training phase builds a second step model 732 to differentiate a second region of the digital image from the remainder of the digital image. Tissue region 476 may be characterized in a second step feature extraction step 702.

A second step feature extraction step 702 may utilize any suitable feature extraction techniques, including conventional feature extraction techniques as described with reference to FIG. 2 or first layer feature extraction techniques as described with reference to FIG. 5 and FIG. 6. The features 310 and feature descriptors 311 used to produce a second step image feature vector 712 by which the tissue region 476 is characterized in step 702 may be specifically chosen for suitability in building a second step model 732. All or some of the pixels 402 may be characterized by the second step feature extraction step 702. Such suitability may be determined, for example, through automatic means or through trial and error.

A second step model 732 is then generated using machine learning techniques in a second step model generation step 722 by associating the feature descriptors of the second step image feature vector 712 with one ground truth label 451 of the multi-dimensional ground truth 450. In the second step model building phase of an exemplary multi-step image recognition framework for performing a multi-step cancer grading task, a second step model 732 may be built using a stroma tissue ground truth label 462. Thus, an exemplary second-step model may be used during a classification phase to differentiate the tissue region 476 of digital pathology image into a stroma region 472, and the remainder, a gland region 477.

Figure 7C:
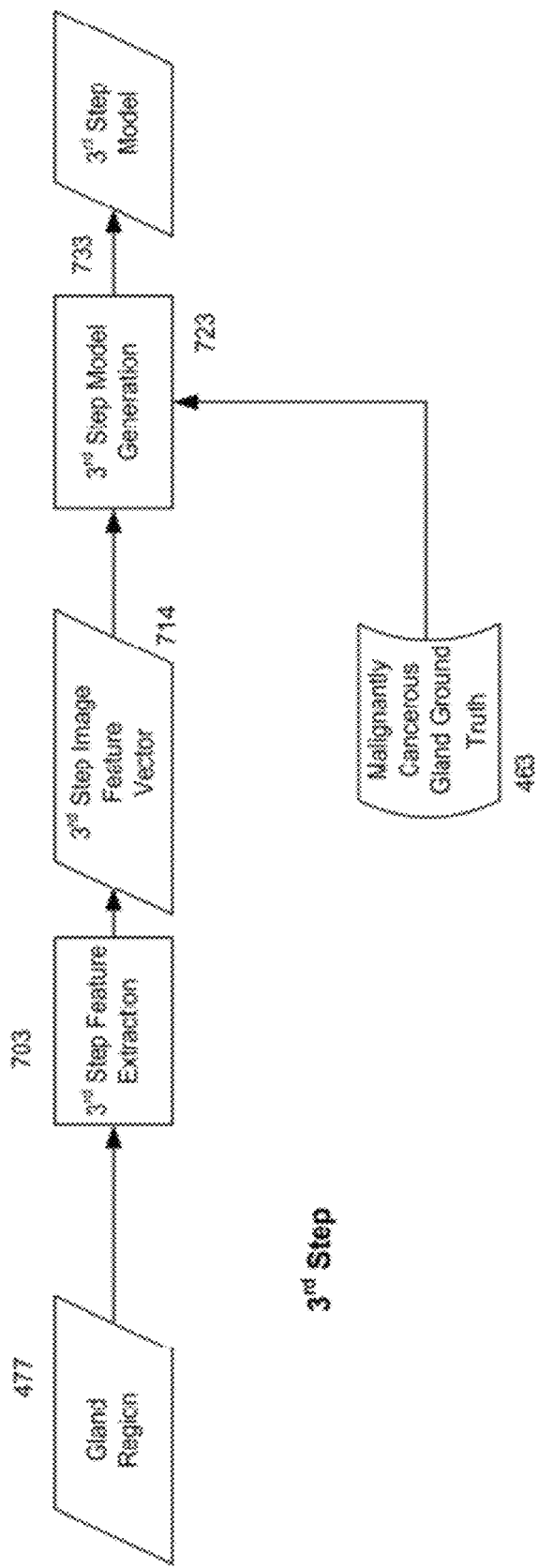

As illustrated in FIG. 7c, a third step of a multi-step image recognition framework model training phase generates a third step model 733 to differentiate a third region of the digital image from the remainder of the digital image. The gland region 477 may be characterized in a third step feature extraction step 703.

A third step feature extraction step 703 may utilize any suitable feature extraction techniques, including conventional feature extraction techniques as described with reference to FIG. 2 or first layer feature extraction techniques as described with reference to FIG. 5 and FIG. 6. The features 310 and feature descriptors 311 used to produce a third step image feature vector 714 by which the gland region 477 is characterized in step 703 may be specifically chosen for suitability in building a third step model 733. All or some of the pixels 402 may be characterized by the third step feature extraction step 703. Such suitability may be determined, for example, through automatic means or through trial and error.

A third step model 733 is then built using machine learning techniques in a third step model generation step 723 by associating the feature descriptors of the third step image feature vector 714 with one ground truth label 451 of the multi-dimensional ground truth 450. In the third step model building phase of an exemplary multi-step image recognition framework for performing a multi-step cancer grading task, a third step model 733 may be built using a malignantly cancerous ground truth label 463. Thus, an exemplary third-step model may be used during a classification phase to differentiate the gland region 477 of a digital pathology image into a malignantly cancerous gland region 473 and a remainder, a not-malignantly-cancerous gland region 478.

Figure 7D:
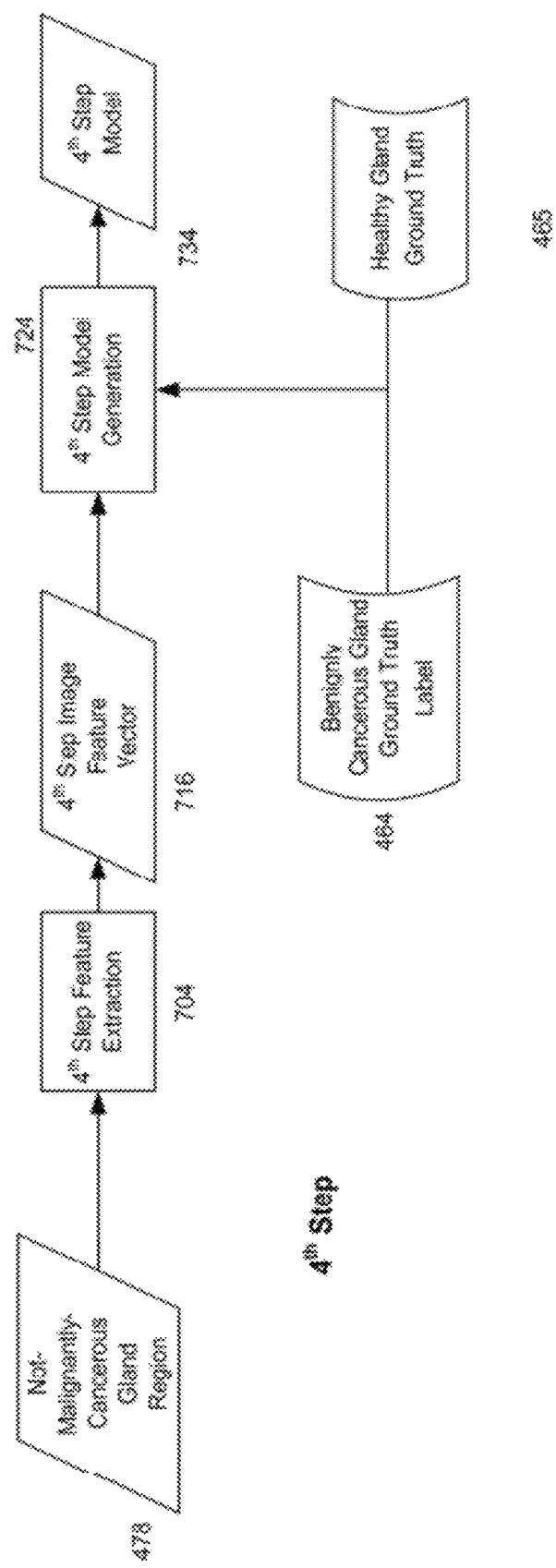

As illustrated in FIG. 7d, a fourth step of a multi-step image recognition framework model training phase generates a fourth step model 734 to differentiate a fourth region of the digital image from the remainder of the digital image. The not-malignantly-cancerous gland region 478 may be characterized in a fourth step feature extraction step 704.

A fourth step feature extraction step 704 may utilize any suitable feature extraction techniques, including conventional feature extraction techniques as described with reference to FIG. 2 or first layer feature extraction techniques as described with reference to FIG. 5 and FIG. 6. The features 310 and feature descriptors 311 used to produce a fourth step image feature vector 716 by which the not-malignantly-cancerous gland region 478 is characterized in step 704 may be specifically chosen for suitability in building a fourth step model 734. All or some of the pixels 402 may be characterized by the fourth step feature extraction step 704. Such suitability may be determined, for example, through automatic means or through trial and error.

A fourth step model 734 may then be built using machine learning techniques in a fourth step model generation step 724 by associating the feature descriptors of the fourth step image feature vector 716 with one ground truth label 451 of the multi-dimensional ground truth 450. If the fourth step model building task is also the final step in a model building phase, any previously unused ground truth labels 451 may also be utilized. In the fourth step model building phase of an exemplary multi-step image recognition framework for performing a multi-step cancer grading task, a fourth step model 734 may be built using a benignly cancerous gland region ground truth label 464 and a healthy gland region ground truth label 465. Thus, an exemplary fourth-step model may be used during a classification phase to differentiate a not-malignantly-cancerous region 478 of a digital pathology image into a benignly cancerous gland region 474, and the remainder, a healthy gland region 475.

As illustrated in FIGS. 7a-d, each step of a model training phase of a multi-step image recognition framework generates a sub-step model by characterizing a portion of the image and associating the image feature descriptors 311 of the resultant image feature vector 310 with a ground truth label 451. Each step may be performed independently, serially or in parallel to each other step. The multiple sub-step models generated during a training phase of a multi-step image recognition framework may then be used to perform a multi-step image recognition framework classification task.

Figure 8:
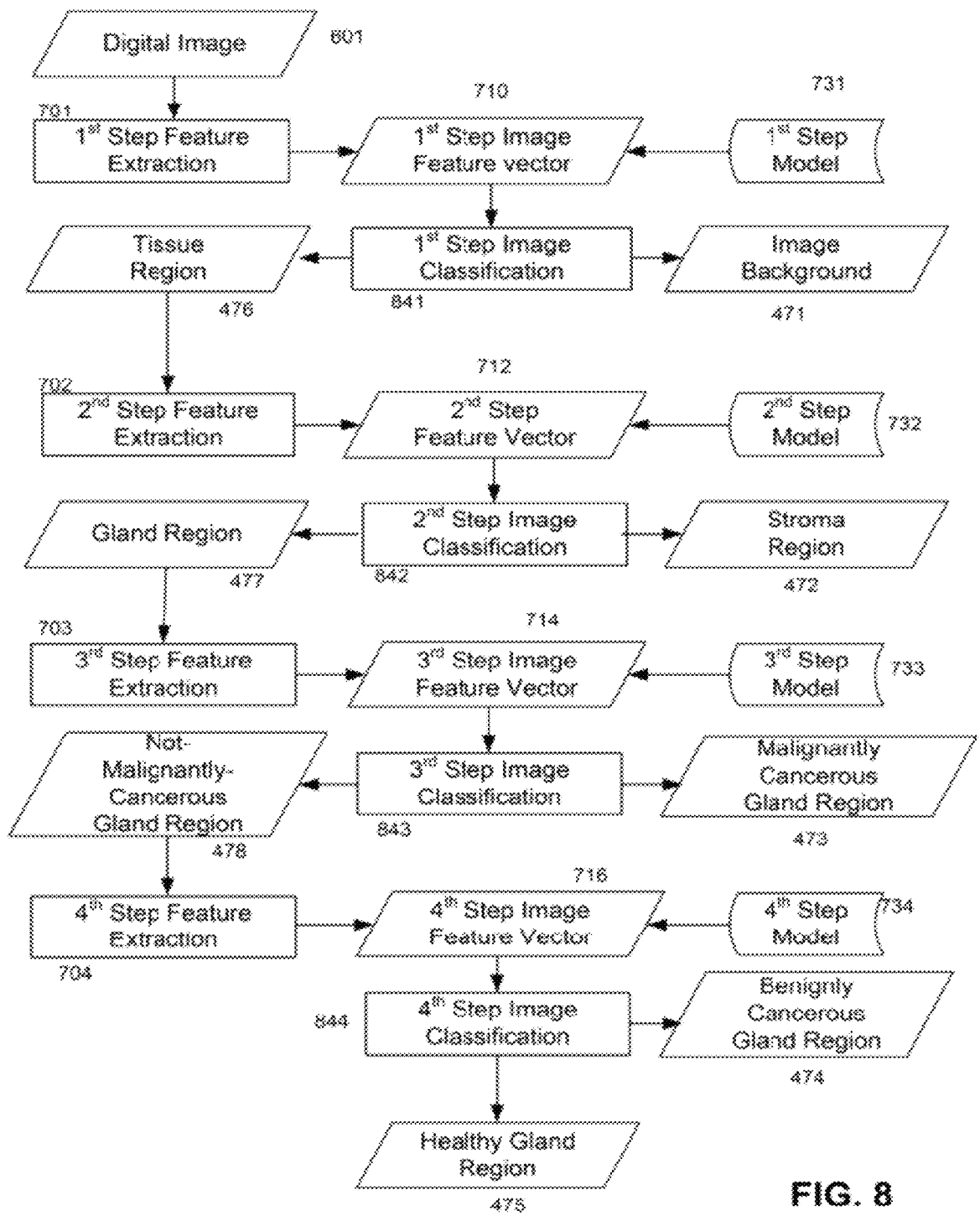
FIG. 8 is a flowchart illustrating the steps of an exemplary multi-step image recognition framework image classification task.

FIG. 8 is a flowchart showing the steps of an exemplary multi-step image recognition framework classification task. During a multi-step image recognition framework classification task, multiple sub-step models are used to complete sub-steps of an image recognition task. Each sub-step model may be used to differentiate a region from the remainder of the image. In one embodiment, each classification sub-step outputs a confidence map, each pixel of which is chosen to represent the likelihood that a corresponding pixel of the input digital image 601 should be classified as belonging to a particular region. A confidence map may be a binary image, each pixel of which is chosen to represent a determination that a corresponding pixel of the input digital image 601 should be classified as belonging to a particular region. A multi-step image recognition framework classification phase may proceed as follows.

A first step of a multi-step image recognition framework model classification phase uses a first step model 731 to differentiate a first region of the digital image 601 from the remainder of the digital image. An input digital image 601 is characterized by a first step feature extraction process (step 701). A first step image feature vector 710 is thus produced. A first step model 731 is then applied to the image feature vector 710 in a first step image classification step 841 to differentiate the image 601 between a first region and a remainder region. The first step image classification step 841 may differentiate the image by producing a confidence map, wherein each pixel represents the likelihood that a corresponding pixel of the input digital image 601 belongs to a first region. In an exemplary embodiment, a first region is an image background region 471 and a remainder region is a tissue region 476.

A second step of a multi-step image recognition framework model classification phase uses a second step model 732 to differentiate a second region of the digital image from the remainder of the digital image 601. The remainder tissue region 476 is characterized by a second step feature extraction process (step 702). A second step image feature vector 712 is thus produced. A second step model 732 is then applied to the image feature vector 712 in a second step image classification step 842 to differentiate the tissue region 476 between a second region and a remainder region. The second step image classification step 842 may differentiate the image by producing a confidence map, wherein each pixel represents the likelihood that a corresponding pixel of the input digital image 601 belongs to a second region. In an exemplary embodiment, a second region is a stroma region 472 and a remainder region is a gland region 477.

A third step of a multi-step image recognition framework model classification phase uses a third step model 733 to differentiate a third region of he digital image from the remainder of the digital image. The gland region 477 is characterized by a third step feature extraction process (step 703). A third step image feature vector 714 is thus produced. A third step model 733 is then applied to the image feature vector 714 in a third step image classification step 843 to differentiate the gland region 477 between a third region and a remainder region. The third step image classification step 843 may differentiate the image by producing a confidence map, wherein each pixel represents the likelihood that a corresponding pixel of the input digital image 601 belongs to a third region. In an exemplary embodiment, a third region is a malignantly cancerous gland region 473 and a remainder region is a not-malignantly-cancerous gland region 478.

A fourth step of a multi-step image recognition framework model classification phase uses a fourth step model 734 to differentiate a fourth region of the digital image from the remainder of the digital image. A not-malignantly-cancerous gland region 478 is characterized by a fourth step feature extraction process (step 704). A fourth step image feature vector 716 is thus produced. A fourth step model 734 is then applied to the image feature vector 716 in a fourth step image classification step 844 to differentiate the not-malignantly-cancerous gland region 478 between a fourth region and a remainder region. The fourth step image classification step 844 may differentiate the image by producing a confidence map, wherein each pixel represents the likelihood that a corresponding pixel of the input digital image 601 belongs to a fourth region. In an exemplary embodiment, a fourth region is a benignly cancerous gland region 474 and a remainder region is a healthy gland region 475.

In the previously described manner, a multi-step image recognition framework model classification phase may classify an input digital image 601 into multiple regions, based on a multi-dimensional ground truth 450. In a cancer grading task, multiple regions for classification may comprise image background, stroma, malignantly cancerous gland tissue, benignly cancerous gland tissue, and healthy gland tissue. The classification phase may result in, for example, the production of multiple confidence maps. Each confidence map may represent the likelihood that each pixel of the input digital image 601 belongs to a one of the regions associated with the specific ground truth labels 451. Multiple confidence maps may be utilized by an operator in various ways. For example, each confidence map could be viewed separately to analyze each distinct region of the classified digital image. Multiple binary confidence maps could be viewed as a colored overlay on the original image 601, wherein each classified region is colored differently. Multiple confidence maps could also be viewed as a composite heat map utilizing the intensity of overlapping colors to represent the likelihood of each pixel belonging to a classified region. Multiple confidence maps could also be used as an input to a system for further image recognition tasks. A person of skill in the art will recognize that an image classified according to the present disclosure may be utilized in various different ways. The multi-step image recognition framework illustrated in FIGS. 7-8 has been described with respect to a four-step model for classifying digital pathology images. A person of skill in the art will recognize that the methods and techniques of the multi-step image recognition framework may be applied to any digital image recognition task, and may be adapted to utilize more or fewer than four steps. In addition, in some embodiments, some steps may be performed in parallel. Additionally, a person of skill in the art will recognize that alternative model training techniques and alternative feature extraction techniques may be utilized.

The multi-step image recognition framework illustrated in FIGS. 7-8 provides several benefits. The multi-step framework permits a gradual approach to a classification task, wherein the results of one step may influence the results of a subsequent step. Each individual sub-step model may be trained to perform a specific differentiation task, differentiating between just two image regions, instead of processing all of the dimensions of a multi-dimensional ground truth 450 simultaneously. When the image feature extraction is performed using a first layer image feature extraction method, as illustrated in FIGS. 5-6, a reduced dimension image feature vector may be used, permitting each step to utilize fewer dimensions of data. Using fewer dimensions of data has the advantage of being less computationally intensive. Utilizing a separate feature extraction step for each step of the multi-step process permits the selective inclusion of features 310 with which to build each sub-step model. In this manner, each sub-step model may use only those features 310 that provide the best results for each particular sub-step, further reducing the computational resources required at each sub-step.

Figure 9:
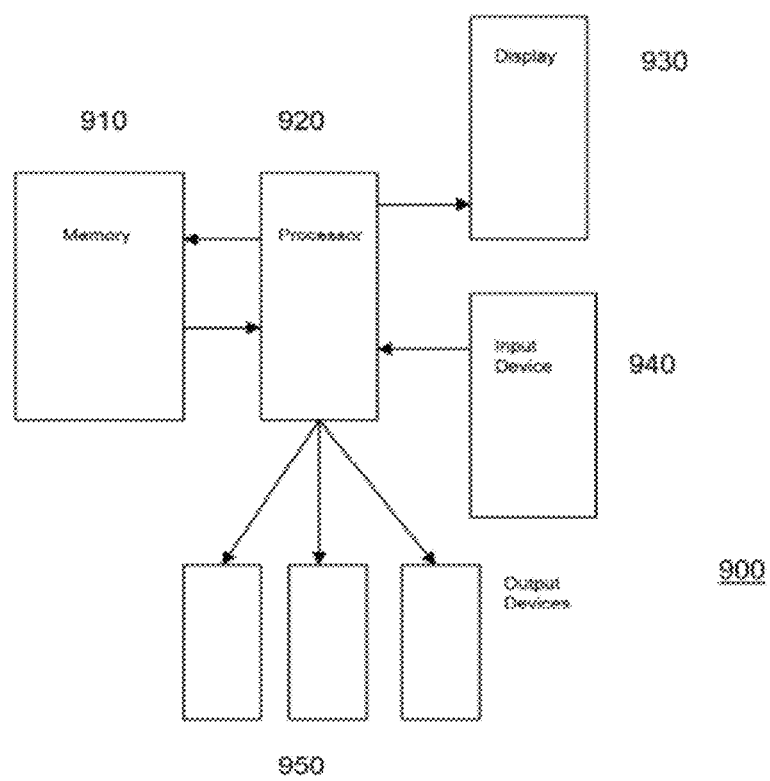
FIG. 9 shows an exemplary computer system for implementing the disclosed methods and techniques.

FIG. 9 illustrates a system 900 consistent with the present disclosure. The techniques and methods described herein may be carried out by a system comprising a memory 910, a processor 920, and a display 930. Images and data sets described herein may be stored in memory 910. Memory 910 may include any storage device capable of storing data processed by processor 920. Memory 910 may be, for example, a floppy disk, or other magnetic medium, or a blank RAM. Processing steps may be carried out by processor 920. Processor 920 may be any commonly available digital processor or may be a special purpose digital processor. Software stored on the computer memory may contain instructions which, when executed by a processor, perform the steps described herein. Results of the disclosed methods and techniques may be displayed on a computer display 930. A user input device, such as a keyboard 940, touch screen, and/or mouse may be provided to permit user interaction. Additional output devices 950, such as a printer, may also be provided.

Image classification techniques disclosed herein provide tissue classification data that may provide valuable information for a variety of pathology analysis tasks. Image classification techniques disclosed herein may be used as part of a comprehensive digital image analysis system, for instance, to classify tissue regions for further computer or manual analysis. Techniques disclosed herein may also be used with no additional techniques for performing tissue type or cancer grading on digital pathology images.

From the foregoing description, it will be appreciated that the present invention provides a method and apparatus for the efficient and accurate classification of a digital pathology image. The proposed multi-step image recognition framework can be generalized to all types of pathology images.

The foregoing methods and systems have been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Embodiments of the methods disclosed herein may be implemented as a computer program product, i.e., a computer program comprising instructions tangibly embodied in a machine-readable storage device, or stored on a tangible computer-readable medium, which when executed control the operation of one or more computers, processors, or logic to perform the steps of the method. A computer program can be written in any form of programming language, including compiled or interpreted languages, and it can be deployed in any form, including as a standalone program or as one or more modules, components, subroutines, or other unit suitable for use in a computing environment. A computer program can be deployed to be executed on one computer or on multiple computers at one site or distributed across multiple sites and interconnected by a communication network.

From the foregoing description, it will be appreciated that the methods and apparatus described herein to classify digital pathology images may be adapted to classify any digital images having characteristics suitable to these techniques, such as high image resolution, non-uniformly distributed texture pattern, and densely structured segments. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented feature extraction method for classifying pixels of a digitized pathology image, the method to be performed by a system comprising at least one processor and at least one memory, the method comprising:
   generating a plurality of characterized pixels from a digitized pathology image;
   determining by the system in a first step feature analysis a first region and a first remainder region of the digitized pathology image based on the plurality of characterized pixels;
   determining by the system, in a plurality of subsequent feature analysis steps, subsequent regions and subsequent remainder regions, wherein each feature analysis step determines a corresponding image region and a corresponding remainder region based on a remainder region determined by an earlier feature analysis step; and
   classifying by the system part or all of the digitized pathology image based on the determined first region, and the determined subsequent regions.

2. The method of claim 1, wherein generating a plurality of characterized pixels further comprises:
   generating a plurality of features corresponding to each pixel of the plurality of pixels, wherein
      each feature of the plurality of features comprises a plurality of feature descriptor values and corresponds to a feature type from among a plurality of feature types: and
      the feature descriptor values of each feature of the plurality of features of each pixel of the plurality of pixels are determined based on data from the digital image.

3. The method of claim 2, wherein generating a plurality of characterized pixels further comprises:
   determining each of a plurality of first layer confidence scores based on a first layer model from among a plurality of first layer models and the plurality of feature descriptor values of each feature of the plurality of features of each pixel of the plurality of pixels.

4. The method of claim 3, wherein,
   the digital pathology image is a training image;
   each pixel of the plurality of pixels is labeled with a ground truth;
   each first layer model from among the plurality of first layer models is generated by machine-learning algorithms based on a correspondence between the ground truth of each pixel of the plurality of pixels and the feature descriptor values of the feature of each pixel of the plurality of pixels corresponding to a designated feature type from among the plurality of feature types; and a different first layer model is generated to correspond to each feature type from among the plurality of feature types.

5. The method of claim 4, wherein the ground truth is a multi-dimensional ground truth.

6. The method of claim 2, wherein generating a plurality of characterized pixels further comprises:
generating a first plurality of features corresponding to a first step feature analysis;
generating a subsequent plurality of features corresponding to a subsequent step feature analysis.

7. The method of claim 1, wherein a feature analysis further comprises:
generating a recognition model for differentiating an image region from a remainder image region based on an association between the characterized pixels and a ground truth label.

8. The method of claim 1, wherein a feature analysis further comprises:
applying a recognition model to the characterized pixels to differentiate an image region from a remainder image region based on an association between the characterized pixels.

9. The method of claim 1, wherein,
the number of subsequent feature analysis steps is three;
the determined subsequent regions are a second region, a third region, and a fourth region;
the first region is an image background region;
the second region is a stroma region;
the third region is a malignant cancer gland region; and
the fourth region is a benign cancer gland region.

10. A system or image recognition analysis of a digital image comprising:
a memory having program instructions and data storage space;
a processor configured to use the program instructions to perform the steps of:
generating a plurality of characterized pixels from a digitized pathology image;
determining in a first step feature analysis a first region and a first remainder region of the digitized pathology image based on the plurality of characterized pixels;
determining in a plurality of subsequent feature analysis steps subsequent regions and subsequent remainder regions, wherein each feature analysis steps determines a corresponding image region and a corresponding remainder region based on a remainder region determined by an earlier feature analysis step; and
classifying part or all of the digitized pathology image based on the determined first region, and the determined subsequent regions.

11. The system of claim 10, wherein the processor configured for generating a plurality of characterized pixels from a digitized pathology image is further configured for:
generating a plurality of features corresponding to each pixel of the plurality of pixels, wherein
each feature of the plurality of features comprises a plurality of feature descriptor values and corresponds to a feature type from among a plurality of feature types; and
the feature descriptor values of each feature of the plurality of features of each pixel of the plurality of pixels are determined based on data from the digital image.

12. The system of claim 11, wherein the processor configured for generating a plurality of characterized pixels is further configured for:
determining each of a plurality of first layer confidence scores based on a first layer model from among a plurality of first layer models and the plurality of feature descriptor values of each feature of the plurality of features of each pixel of the plurality of pixels.

13. The system of claim 12, wherein,
the digital pathology image is a training image;
each pixel of the plurality of pixels is labeled with a ground truth;
each first layer model from among the plurality of first layer models is generated by machine-learning algorithms based on a correspondence between the ground truth of each pixel of the plurality of pixels and the feature descriptor values of the feature of each pixel of the plurality of pixels corresponding to a designated feature type from among the plurality of feature types; and
a different first layer model is generated to correspond to each feature type from among the plurality of feature types.

14. The system of claim 13, wherein the ground truth is a multi-dimensional ground truth.

15. The system of claim 11, wherein the processor configured for generating a plurality of characterized pixels is further configured for:
generating a first plurality of features corresponding to a first step feature analysis;
generating a subsequent plurality of features corresponding to a subsequent step feature analysis.

16. The system of claim 10, wherein the processor configured for a feature analysis is further configured for:
generating a recognition model for differentiating an image region from a remainder image region based on a ground truth label.

17. The system of claim 10, wherein the processor configured for a feature analysis is further configured for:
applying a recognition model to the characterized pixels to differentiate an image region from a remainder image region based on an association between the characterized pixels.

18. The system of claim 10, wherein,
the number of subsequent feature analysis steps is three;
the determined subsequent regions are a second region, a third region, and a fourth region;
the first region is an image background region;
the second region is a stroma region;
the third region is a malignant cancer gland region; and
the fourth region is a benign cancer gland region.

* * * * *